(12) United States Patent
Shah-Nazaroff et al.

(10) Patent No.: US 9,485,529 B2
(45) Date of Patent: *Nov. 1, 2016

(54) METHOD AND APPARATUS FOR ORDERING ENTERTAINMENT PROGRAMS FROM DIFFERENT PROGRAMMING TRANSMISSION SOURCES

(71) Applicant: Intel Corporation, Santa Clara, CA (US)

(72) Inventors: Anthony A. Shah-Nazaroff, Santa Clara, CA (US); Jean M. Goldschmidt Iki, San Jose, CA (US); Kenneth Alan Moore, Ben Lomond, CA (US); Christopher D. Williams, Soquel, CA (US)

(73) Assignee: Intel Corporation, Santa Clara, CA (US)

(*) Notice: Subject to any disclaimer, the term of this patent is extended or adjusted under 35 U.S.C. 154(b) by 511 days.

This patent is subject to a terminal disclaimer.

(21) Appl. No.: 13/972,260

(22) Filed: Aug. 21, 2013

(65) Prior Publication Data

US 2014/0040927 A1    Feb. 6, 2014

Related U.S. Application Data

(60) Continuation of application No. 09/580,305, filed on May 26, 2000, now Pat. No. 8,539,530, and a division of application No. 09/183,587, filed on Oct. 30, 1998, now Pat. No. 6,157,377.

(51) Int. Cl.
*G06F 3/00* (2006.01)
*G06F 13/00* (2006.01)
(Continued)

(52) U.S. Cl.
CPC .... *H04N 21/25435* (2013.01); *H04N 7/17318* (2013.01); *H04N 21/234327* (2013.01); *H04N 21/2543* (2013.01); *H04N 21/25816* (2013.01);
(Continued)

(58) Field of Classification Search
CPC ............ H04N 5/44543; H04N 21/84; H04N 21/482; H04N 21/435; H04N 21/4345
USPC ............................ 725/40, 50, 132, 140, 152
See application file for complete search history.

(56) References Cited

U.S. PATENT DOCUMENTS

| 3,679,813 A | 7/1972 | Banning, Jr. |
| 4,890,322 A | 12/1989 | Russell, Jr. |

(Continued)

FOREIGN PATENT DOCUMENTS

| WO | 95/15658 A1 | 6/1995 |
| WO | 96/28910 A1 | 9/1996 |

(Continued)

*Primary Examiner* — Jason Salce
(74) *Attorney, Agent, or Firm* — Trop, Pruner & Hu, P.C.

(57) ABSTRACT

The present invention provides an improved method and apparatus for purchasing media features for programming transmissions. A selection is sent to a server system to buy an upgraded media feature for a programming transmission. The server system automatically coordinates purchasing the media feature from a programming transmission source and providing the media feature from the programming transmission source. In one embodiment, an entertainment system includes a user interface from which a viewer selects an upgraded media feature for a programming transmission, wherein the programming transmission with the upgraded media feature is provided to the entertainment system.

31 Claims, 7 Drawing Sheets

(51) Int. Cl.

| | | |
|---|---|---|
| *H04N 5/445* | (2011.01) | |
| *H04N 21/2543* | (2011.01) | |
| *H04N 7/173* | (2011.01) | |
| *H04N 21/2343* | (2011.01) | |
| *H04N 21/258* | (2011.01) | |
| *H04N 21/422* | (2011.01) | |
| *H04N 21/462* | (2011.01) | |
| *H04N 21/472* | (2011.01) | |
| *H04N 21/478* | (2011.01) | |
| *H04N 21/4782* | (2011.01) | |
| *H04N 21/84* | (2011.01) | |
| *H04N 21/482* | (2011.01) | |

(52) U.S. Cl.
CPC .... *H04N 21/42201* (2013.01); *H04N 21/4622* (2013.01); *H04N 21/472* (2013.01); *H04N 21/4782* (2013.01); *H04N 21/47815* (2013.01); *H04N 21/482* (2013.01); *H04N 21/84* (2013.01)

(56) References Cited

U.S. PATENT DOCUMENTS

| | | |
|---|---|---|
| 5,155,590 A | 10/1992 | Beyers, II et al. |
| 5,208,665 A | 5/1993 | McCalley et al. |
| 5,504,933 A | 4/1996 | Saito |
| 5,512,935 A | 4/1996 | Majeti et al. |
| 5,646,692 A | 7/1997 | Brüls |
| 5,675,732 A | 10/1997 | Majeti et al. |
| 5,761,602 A | 6/1998 | Wagner et al. |
| 5,790,172 A | 8/1998 | Imanaka |
| 5,838,314 A | 11/1998 | Neel et al. |
| 5,850,527 A | 12/1998 | Suzuki |
| 5,852,527 A | 12/1998 | Fujii |
| 5,990,927 A | 11/1999 | Hendricks et al. |
| 6,006,257 A | 12/1999 | Slezak |
| 6,057,872 A | 5/2000 | Candelore |
| 6,101,535 A | 8/2000 | Hussmann et al. |
| 6,105,060 A | 8/2000 | Rothblatt |
| 6,141,682 A | 10/2000 | Barker |
| 6,144,402 A | 11/2000 | Norsworthy et al. |
| 6,157,377 A | 12/2000 | Shah-Nazaroff et al. |
| 6,275,988 B1 | 8/2001 | Nagashima et al. |
| 6,308,328 B1 | 10/2001 | Bowcutt et al. |
| 6,311,329 B1 | 10/2001 | Terakado et al. |
| 6,357,043 B1 | 3/2002 | Ellis et al. |
| 6,381,747 B1 | 4/2002 | Wonfor et al. |
| 6,476,873 B1 | 11/2002 | Maeng |
| 6,529,866 B1 | 3/2003 | Cope et al. |
| 6,637,032 B1 | 10/2003 | Feinleib |
| 2001/0029608 A1 | 10/2001 | Nagashima et al. |
| 2003/0145333 A1 | 7/2003 | Hjelsvold et al. |

FOREIGN PATENT DOCUMENTS

| | | |
|---|---|---|
| WO | 97/03521 A2 | 1/1997 |
| WO | 98/42129 A1 | 9/1998 |
| WO | 98/43406 A1 | 10/1998 |

WELCOME TO THE OPTIONAL PROGRAMING GUIDE!
SEPTEMBER 22, 1998 , 11:36 AM

CABLE
PAY PER VIEW:
 1. DISNEY'S LADY AND THE TRAMP  $2.50
    SHOW TIMES: 1:00 PM ☐ ; 3:00 PM ☐ ; 5:00 PM ☐
    VIEW ONLY (DEFAULT); VIEW AND RECORD ☐ (+$1.50)
    AUDIO UPGRADE? YES ☐ (+$0.50)
 2. STAR TREK V  $3.00
    ...

SATELITE
ON DEMAND:
 1. TITANIC  $7.00 ☐
    VIDEO QUALITY— REGULAR (DEFAULT); GOOD ☐ (+$0.50); EXCELLENT ☐ ($1.00)
    VIEW ONLY (DEFAULT); VIEW AND RECORD ☐ (+$3.50)
    AUDIO UPGRADE? YES ☐ (+$0.50)
 2. AIR FORCE ONE  $5.00
    ...

INTERNET
 1. MECH WARRIOR 6000  $1.50/HR
    VIDEO UPGRADE? YES ☐ (+$1.00/HR)
    AUDIO UPGRADE? YES ☐ (+$0.50/HR)
 2. SUPER FUN HOUSE  $1.00/HR
    ...

[ SUBMIT ]  [ CANCEL ]

FIG. 5

METHOD AND APPARATUS FOR ORDERING ENTERTAINMENT PROGRAMS FROM DIFFERENT PROGRAMMING TRANSMISSION SOURCES

The present patent application is a continuation of U.S. patent application Ser. No. 09/580,305, filed May 26, 2000 (pending) which was a divisional of U.S. patent application Ser. No. 09/183,587, filed Oct. 30, 1998 (issued as U.S. Pat. No. 6,157,377). The entire contents of those applications are incorporated herein by reference.

BACKGROUND OF THE INVENTION

Field of the Invention

The present invention pertains to the field of programming transmission systems. More particularly, this invention relates to the art of purchasing upgraded media features for programming transmissions.

Background

In recent years, new forms of television, radio, and Internet programming transmissions, such as broadcasts, have developed. For instance, digital cable and satellite systems can provide hundreds of channels of programming with a range of quality and features available on each channel. Similarly, viewers can take part in an increasing variety of interactive events on the Internet, over cable systems, etc., such as games, market places, and chat rooms. Even with conventional antenna reception, a wide range of viewing and listening choices are available in many areas, and the introduction of digital broadcasts will increase the number of features and options available on each channel.

Many viewers may not have entertainment systems that can take full advantage of all of the media features now available and likely to become available. For instance, audio media features may include monotone, stereo, and various types of multi-channel surround sound. A viewer may not have a television with stereo or surround sound capability, in which case the additional bandwidth needed to broadcast with the higher sound quality is wasted.

Other viewers may not appreciate certain media features for certain broadcasts. For instance, a viewer may not care whether or not a news broadcast is in stereo, but the same viewer may want to watch a movie in multi-channel surround sound.

In each of these exemplary situations, viewers may wish to pay only for the media features that they can use, or they may be willing to pay more to receive certain broadcasts with higher levels of media features. Therefore, a need exists for an improved method and apparatus for purchasing media features for broadcasts.

SUMMARY OF THE INVENTION

The present invention provides an improved method and apparatus for purchasing media features for programming transmissions. A selection is sent to a server system to buy an upgraded media feature for a programming transmission. The server system automatically coordinates purchasing the media feature from a programming transmission source and providing the media feature from the programming transmission source. In one embodiment, an entertainment system includes a user interface from which a viewer selects an upgraded media feature for a programming transmission, wherein the programming transmission with the upgraded media feature is provided to the entertainment system.

BRIEF DESCRIPTION OF THE DRAWINGS

Examples of the present invention are illustrated in the accompanying drawings. The accompanying drawings, however, do not limit the scope of the present invention. Like references in the drawings indicate similar elements.

FIG. 5 illustrates one embodiment of a display provided by a user interface from which upgraded media features can be selected.

DETAILED DESCRIPTION

Figure 1:
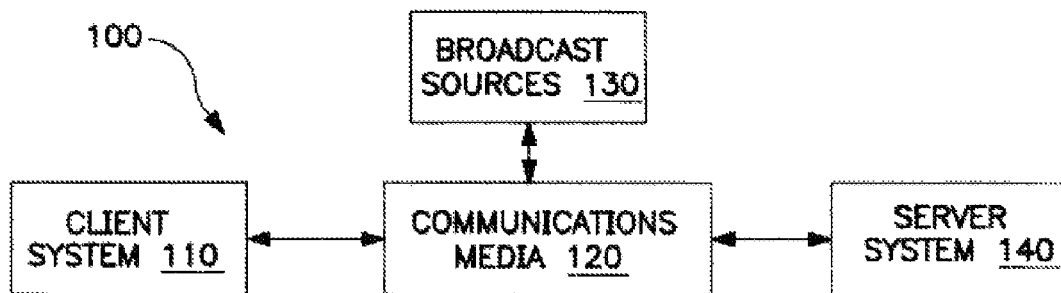
FIG. 1 illustrates one embodiment of the present invention.

FIG. 1 illustrates one embodiment of the present invention. The present invention allows viewers to purchase upgraded media features. For instance, in one embodiment, a viewer at client system 110 who has ordered a pay-per-view movie can pay an additional fee to receive the movie at a higher video resolution and/or in digital Dolby surround sound rather than monotone audio.

Upgraded media features include, but are not limited to, a wide variety of audio, video, and interactive effects. For instance, video resolution can be upgraded. This is particularly true for digital transmissions, such as broadcasts, from a view-on-demand programming source, such as a broadcast source. A broadcast source may have the option to send multiple broadcasts over a single digital channel simultaneously. For instance, a view-on-demand broadcast source may have access to 200 channels in a particular area, and up to 20 broadcasts may be downloaded simultaneously over each channel. As the number of simultaneous broadcasts increase, the video quality of any one broadcast decreases. So, a viewer could pay more to receive a broadcast over a channel with fewer simultaneous broadcasts.

In one embodiment, a range of upgrades may be available. For instance, a default range of video resolution may be at the lowest possible resolution level, having the maximum number of simultaneous broadcasts on a single channel. A highest range may be at the maximum possible resolution, having a single broadcast on a single channel. Certain televisions, however, may not be able to take full advantage of the highest possible resolution because the televisions cannot resolve that much detail. In which case, one or more middle ranges may be created at approximately the levels of resolution that many types of televisions can display. For each incremental level of resolution, more bandwidth is needed for the broadcast, so the price of each incremental level of resolution may be higher.

Similar approaches can be contemplated and implemented for a variety of upgraded media features from a wide range of broadcast sources. As another example, a viewer may pay for upgraded access to an interactive event. For instance, a real-time three-dimensional virtual gaming environment may be accessed by hundreds of virtual competitors over a network connection such as the Internet, a cable connection, satellite communications, etc. For each competitor, processing bandwidth may be expended providing video and audio, and tracking movements and actions, etc. A gamer may purchase upgraded media features for additional video detail, audio quality, the ability to speak in real time to other garners, etc. Each incremental level of detail consumes more bandwidth and may have an incrementally higher cost.

Another possible upgraded media feature is a pay-per-record feature. For instance, digital television can be transmitted in a view-only format so that a recorded image of the transmission is impaired. In which case, a viewer may buy an upgraded media feature to receive a recordable version of the broadcast.

In the illustrated embodiment of FIG. 1, as discussed in more detail below, a viewer at client system 110 selects one or more upgraded media features for a broadcast. The selection is sent to server system 140 over communications media 120. Server system 140 automatically coordinates billing for the upgraded media features, and automatically coordinates providing the upgraded media features from broadcast sources 130. Numerous client systems 110 can be coupled to one or more server systems 140. For instance, server systems 140 may be distributed by region, and a region may include thousands of client systems 110.

Communications media 120 represents a wide range of media. For instance, communications media 120 could include UHFNHF wireless transmission, twisted pair telephone lines, fiber optic lines, coaxial cable lines such as cable television lines, satellite antenna wireless transmissions, computer network communications such as through the Internet or a wide or local area network, etc. Communications among client system 110, broadcast sources 130, and server system 140 may involve a combination of media within communications media 120. For instance, client system 110 may communicate with server system 140 over the Internet, server system 140 may communicate with broadcast sources 130 over direct telephone lines, and broadcast sources 130 may transmit to client system 110 over satellite antenna transmissions. Numerous additional combinations and alternate connections can be contemplated and used.

Broadcast sources 130 can include a wide variety of digital and analog audio, video, and interactive sources. For instance, broadcast sources 130 may include local television and radio stations received over a regular antenna, television and radio stations received over a mini-dish satellite antenna, television and radio stations received over a coaxial cable, a number of interactive web sites accessible over the Internet, etc. Broadcasts can also be received from broadcast sources simultaneously. For instance, a viewer may receive an interactive broadcast, such as a game, and an audio broadcast, such as music, at the same time.

Figure 2:
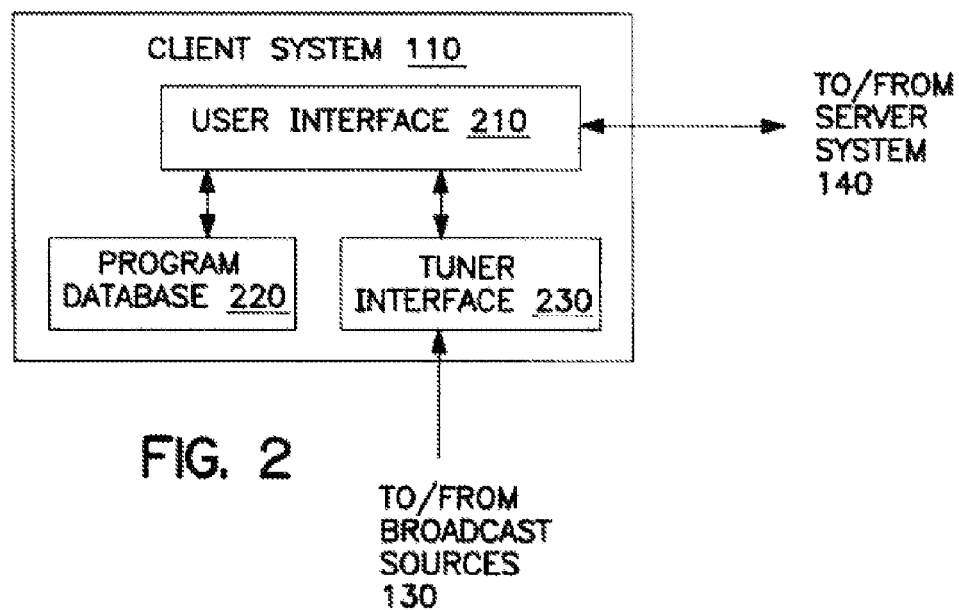
FIG. 2 illustrates one embodiment of one aspect of the present invention.

FIG. 2 illustrates one embodiment of client system 110 in more detail. As discussed below with reference to FIG. 6, client system 110 may be an entertainment system including numerous entertainment components. In the illustrated embodiment, the components include user interface 210, program database 220, and turner interface 230. User interface 210 includes any of a number of output devices such as a display device and/or an audio device to provide a viewer with one or more optional upgrades and a cost for each upgrade for a given broadcast. User interface 210 also includes any of a number of input devices such as a mouse, a track ball, a key pad, a voice recognition unit, etc. The viewer can select from the one or more optional upgrades using an input device.

The user interface also communicates with server system 140, program database 220, and tuner interface 230. From program database 220, user interface 210 can retrieve optional upgrades available for each broadcast. In one embodiment, programming database 220 also includes a programming guide which lists broadcasts by time and channel. The optional upgrades for each broadcast can be listed along with the respective broadcast in the programming guide.

Programming database 220 can be updated on a regular basis. For instance new programming information can be downloaded daily or weekly from any of a number of sources and stored in programming database 220. In one embodiment, client system 110 automatically receives updated programming information from broadcast sources 130 over the Internet on a daily basis.

Tuner interface 230 can include any of a number of tuners, receivers, descramblers, etc. to interface with broadcast sources 130 over communications media 120. For instance, in one embodiment, tuner interface 230 includes a descrambler for certain pay cable channels, a UHFNHF tuner, a digital television receiver, and a satellite television receiver.

Figure 3:
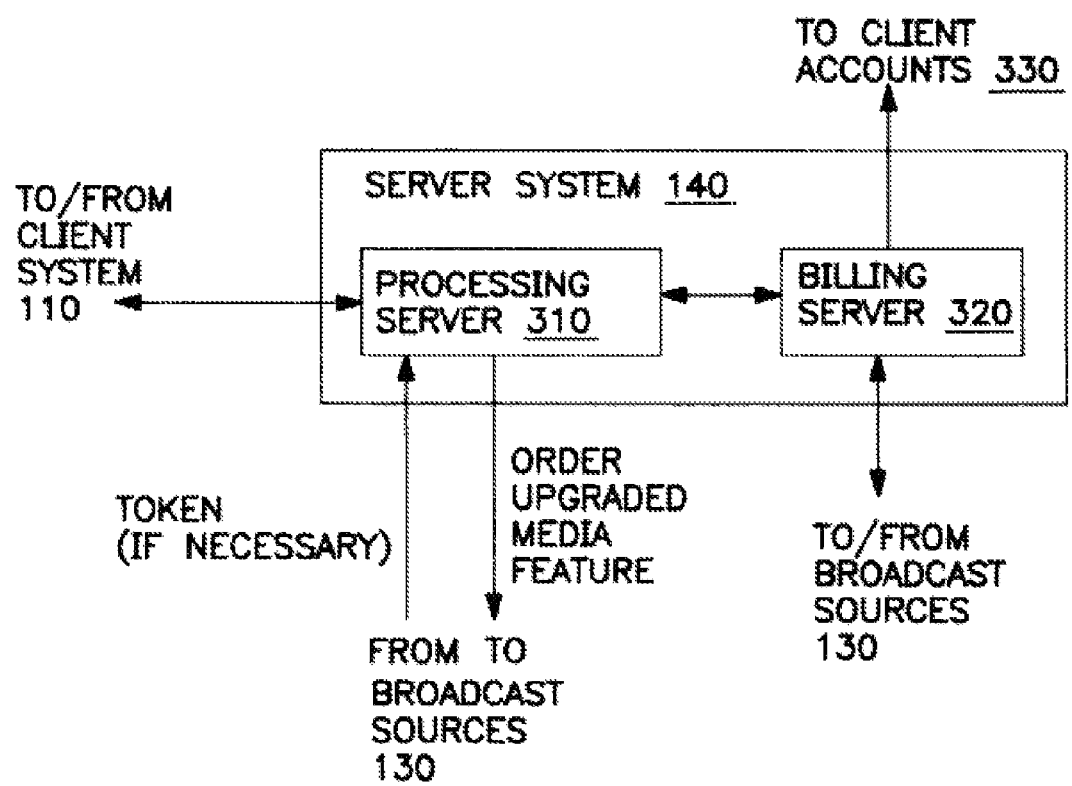
FIG. 3 illustrates one embodiment of a second aspect of the present invention.

FIG. 3 illustrates one embodiment of server system 140 in more detail. Server system 140 includes processing server 310 and billing server 320. Processing server 310 receives a selection from client system 110 over communications media 120. The selection indicates one or more upgraded media features for a particular broadcast and a cost for each upgrade. Processing server 310 provides the cost information to billing server 320. With the upgraded media features, processing server 310 places an order to the respective broadcast source or sources among broadcast sources 130 to have the upgraded media features provided to the viewer at client system 110.

A particular broadcast source can be identified in any of a number of different ways. For instance, the selection from client system 110 may include a broadcast identifier to which the upgraded media features correspond. Then, processing server 310 may cross reference the broadcast with a particular broadcast source based on a programming guide or an index.

In one embodiment, providing the upgraded feature involves broadcasting one of a number of different versions of a broadcast over a given channel. In which case, the particular broadcast source may provide processing server 310 with a token identifying the given channel. The selection from client system 110 may also include an identifier of the client system, so that processing server 310 can provide the token to client system 110, and client system 110 can tune to the appropriate channel based on the token.

In other embodiments, providing the upgraded feature involves descrambling the upgraded media feature within a broadcast on a given channel. For instance, if a viewer buys an upgraded media feature to be able to record a digital broadcast that is normally transmitted in a view-only format, an additional part of the signal can be descrambled to make the broadcast recordable. In one embodiment, the descrambling can be performed at the broadcast source, in which case processing server 310 provides an identifier of client system 110 to the broadcast source and the broadcast source descrambles the broadcast for the identified client system 110.

In other embodiments, the descrambling, or conditional access, is done at the client system. In which case, the particular broadcast source can provide a token to processing server 310. In turn, processing server 310 will provide the token to client system 110, and client system 110 will use the token to obtain the conditional access.

In certain embodiments, a viewer at client system 110 may select a blanket upgrade, so that all broadcasts are received with certain levels media features whenever the media features are available. For instance, a viewer may select a blanket upgrade to receive broadcasts in stereo. In which case, processing server 310 can store the blanket upgrade for the particular viewer and coordinate the provision of each broadcast accordingly, and, as discussed below, billing server 320 can coordinate billing the blanket upgrade accordingly.

Billing server 320 can coordinate billing for all the upgraded media features. In one embodiment, billing server 320 stores billing information for a particular client responsible for a given client system 110, and bills that client for all charges related to the particular client system 110. In alternate embodiments, billing server 320 stores client billing information for individual viewers and bills individual viewers no matter which client system 110 the particular viewer is at.

Billing server 320 can identify a client in any of a number of different ways. For instance, the selection information provided by client system 110 may include an identifier of the client system, or an identifier of the particular viewer depending on the billing scheme. The particular viewer can be identified at client system 110 in any of a number of different ways. For instance a viewer may be asked to provide a password to gain access to server system 140 from client system 110. In another example, a face recognition utility could be used to automatically identify the viewer at client system 110. Countless additional identification schemes can be contemplated and implemented.

In one embodiment, billing server 320 stores credit card information for clients and bills upgrades to the respective client accounts 330. Billing server 320 may bill a client's account for each transaction or according to a billing cycle, including several transactions in one bill. Billing server 320 may bill the entire amount directly to client accounts 330 and provide a receipt to broadcast sources 130. Then, billing server 320 may receive periodic billings from broadcast sources 130 for their share. For instance, billing server 320 may bill several thousand clients every month, but only receive one bill each month from each broadcast source for the total amount of their respective shares.

Alternately, billing server 320 may bill client accounts 330 only for the portion of the fees owed for services performed by server system 140. In which case, billing server 320 may provide billing information or client identification data to the respective broadcast sources 130 for each transaction so that the respective broadcast sources can bill the client directly.

In alternate embodiments, billing information could be provided from client system 110 for each individual transaction rather than storing the billing information at billing server 320. For instance, if client system 110 is located in a hotel, many different viewers may use the system. Rather than storing billing information for each new viewer, billing server 320 may receive the billing information along with the selection of media upgrades. That is, the user interface at client system 110 can collect credit card information along with a selection of media upgrades.

Billing server 320 may perform additional functions. For instance, billing server 320 may check a client's credit account before authorizing processing server 310 to coordinate provision of an upgraded media feature. Billing server 320 may also store a database of prices and identify a price for an upgrade based on an identifier of the broadcast and the upgrade received from client system 110. Numerous alternative functions and billings schemes can be contemplated and implemented.

In alternate embodiments, one or more components in FIGS. 1-3 can be combined, re-arranged, and/or deleted. Alternate embodiments may also include numerous additional components, as illustrated for one embodiment in FIG. 6 below.

Figure 4:
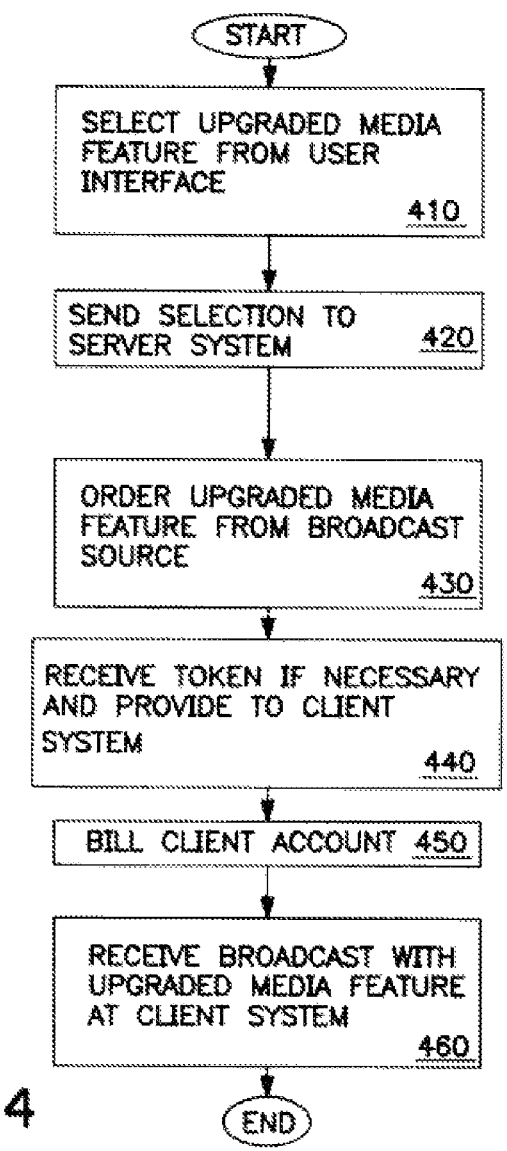
FIG. 4 demonstrates one embodiment of the present invention.

FIG. 4 demonstrates how an upgraded media feature can be purchased using one embodiment of the present invention. In step 410, an upgraded media feature is selected from user interface 210. The selection is sent to server system 140 over communications media 120, in step 420. In step 430, processing server 310 orders the upgraded media feature from one of broadcast sources 130. Depending on how the upgraded media feature is to be provided, processing server 310 may receive a token back from the broadcast source, in step 440. In which case, processing server 310 provides the token to client system 110 so that client system 110 can receive the upgraded media feature. In step 450, billing server 320 coordinates billing the client's account, and in step 460, the broadcast is received by client system 110 with the upgraded media feature.

FIG. 5 illustrates one embodiment of a display provided on user interface 210. The display includes a programming list from various broadcast sources and lists of upgraded media features for each broadcast along with a cost for each feature. For instance, in the illustrated display, the client system has access to pay-per-view broadcasts from a cable broadcast source. The programming guide lists a number of available movies including "Disney's Lady and the Tramp." The base rate for the move is $2.50, and three show times are listed. The default media feature is view only. The viewer has the option, however, to purchase an upgraded media feature to receive a recordable version for an additional $1.50. The viewer can also select an audio upgrade for $0.50. Numerous additional pay-per-view broadcasts could be listed, with a variety of upgrade options for each.

The viewer also has access to view-on-demand movies from a satellite broadcast source. The first movie listed is "Titanic," and the viewer has the option to down load it at any time for $7.00. Upgrade options for "Titanic" include video quality upgrades, for instance to download the movie over a channel with fewer simultaneous broadcasts to receive higher resolution and definition, a recordable version upgrade, and an audio upgrade. Numerous additional view-on-demand broadcasts could be listed, with a variety of upgrade options for each.

The viewer also has access to a list of interactive events over the Internet. The list includes access to "Mech Warrior 3000" at a default rate of $1.50 per hour. The viewer has the option to buy video upgrades and audio upgrades, which the viewer may or may not be interested in depending on the video and audio capabilities of his or her entertainment system. Numerous additional interactive events could be listed, with a variety of upgrade options for each.

Figure 6:
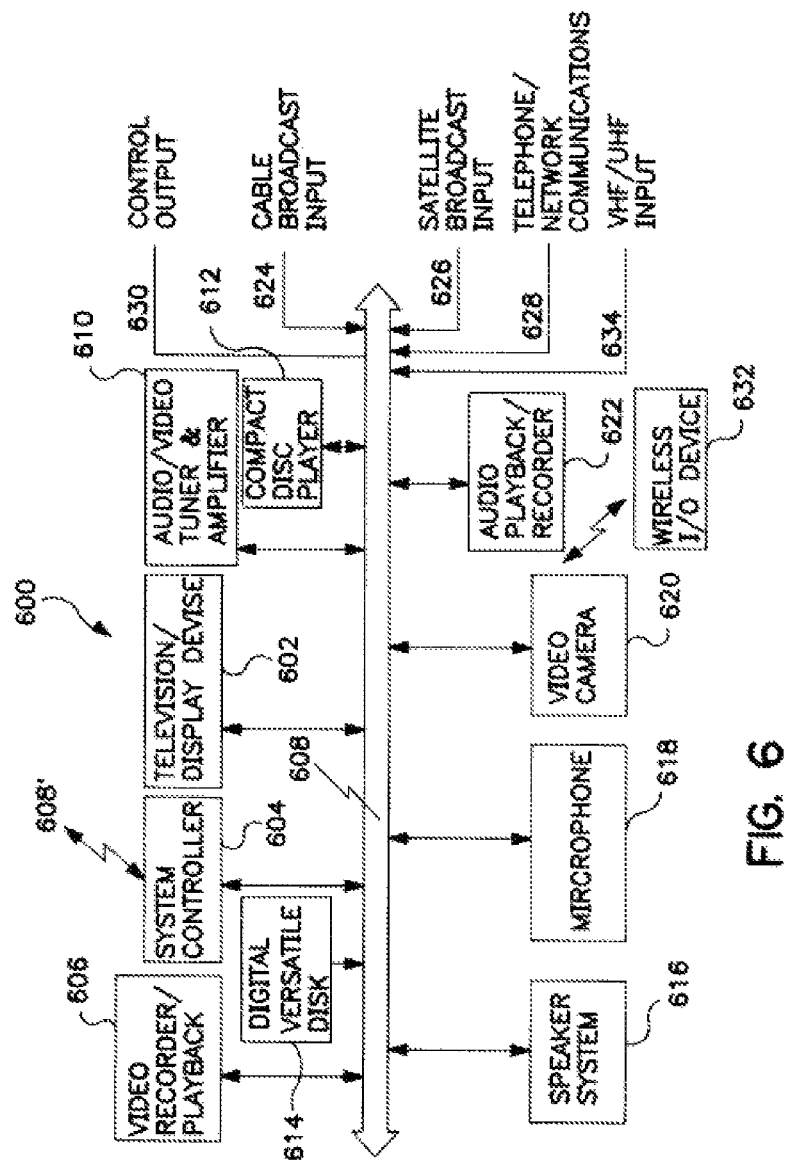
FIG. 6 illustrates one embodiment of an entertainment system suitable for use with the present invention.

FIG. 6 is a block diagram illustrating the system components of an exemplary entertainment system comprising one embodiment of client system 110. System 600 includes television/display device 602, video recorder/playback device 606, digital video disk (DVD, also referred to as digital versatile disk) recorder/playback device 614, audio/video tuner and/or amplifier 610, audio playback/recorder device 622, and compact disc (CD) player 612, all coupled to a common input/output (I/O) bus 608. It is to be appreciated that the use of the common I/O bus 608 is for ease of explanation in the diagram only, and that a number of alternative means of routing input and output signals may be beneficially employed. For example, audio input and output could be routed with an appropriate number of independent audio "patch" cables, video signals may be routed with independent coaxial cables, and control signals may be routed along a two-wire serial line, or through infrared (IR) communication signals or radio frequency (RF) communication signals. By way of further example, audio, video, and/or control signals may also be routed along one or more buses in accordance with the Universal Serial Bus Specification, Revision 1.0 (Jan. 15, 1996), or the High Performance Serial Bus IEEE Standard 1394, IEEE std. 1394-1995, draft 8.0v3, approved Dec. 12, 1995.

In addition, system 600 includes speaker system 616, microphone 618, video camera 620 and a wireless input/output control device 632. In one embodiment, wireless I/O control device 632 is an entertainment system remote control unit which communicates with the components of system 600 through IR signals. In another embodiment, wireless I/O control device 632 may be a wireless keyboard and/or cursor control device that communicates with the components of system 600 through IR signals or RF signals. In yet another embodiment, wireless I/O control device 632 may be an IR or RF remote control device similar in appearance to a typical entertainment system remote control with the added feature of a track-ball or other cursor control mechanism that allows a user to position a cursor on a display of system 600.

At the core of system 600 is system controller 604 incorporated with the features of the present invention, configured to control a variety of features associated with the system components. As depicted, system controller 604 is coupled to each of the system components, as necessary, through I/O bus 608. In one embodiment, in addition to or in place of I/O bus 608, system controller 604 may be configured with a wireless communications transmitter (or transceiver), which is capable of communicating with the system components via IR signals or RF signals 608'. Regardless of the control medium, system controller 604 is configured to control each of the entertainment system components of system 600, although it is understood that each of the components may be individually controlled with wireless I/O device 632.

System controller 604 retrieves and stores entertainment programming information available from a wide variety of sources. During operation of system 600, system controller 604 dynamically configures the operating parameters of system 600 and offers additional value added features to enhance the user's enjoyment of system 600, for example as discussed above for the present invention. In one embodiment, system controller 604 may be a computer system incorporated with the teachings of the present invention, as will be discussed in further detail below with reference to FIG. 7. In another embodiment, system controller 604 may be a "set-top" box endowed with the necessary processing power and incorporated with the teachings of the present invention. Regardless of the particular embodiment, system controller 604 may also be referred to as a "convergence system" designed to integrate the world of entertainment systems and computing platforms to achieve the beneficial results of the present invention among others.

Although the present invention is described in the context of the exemplary embodiments presented in the figures, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 6. By way of example, devices may be added to system 600, or devices (e.g., video camera 620, microphone 618, DVD recorder/playback device 614, etc.) may be removed from system 600.

As illustrated in FIG. 6, system 600 can be configured to receive audio/video programming input from a wide variety of sources. In one embodiment, system 600 receives programming input from any or all of the following sources: cable broadcast 624, satellite broadcast 626 (e.g., via a satellite dish), very high frequency (VHF) or ultra high frequency (UHF) radio frequency communication of the broadcast networks 634 (e.g., via an aerial antenna), and/or the telephone/computer network interface 628. Further, it will be appreciated by those skilled in the art that cable broadcast input 624, satellite broadcast input 626 and VHF/UHF input 634 may include analog and/or digital programming such as high definition television (HDTV). Additionally, audio/video programming may be received from a CD-ROM, DVD, or other digital or analog storage device via a playback device of system 100 (e.g., DVD recorder/playback device 614). The Internet, an entertainment network, or other network may also provide audio/video programming, via, for example, interface 628.

In addition to programming input, system 600 is also configured with a number of general purpose control outputs 630 which may be configured to control any number of devices. In one embodiment, for example, as system controller 604 configures system 600 to display a movie, it may also dim the lights in the room to a predetermined level to further enhance the viewing environment. Control circuitry which allows a computing device to control, for example, lighting, thermostat settings, and other household appliances (via, for example, the electrical wiring in a house) are well known in the art and thus will not be described further.

Except for the incorporated teachings of the present invention, as discussed above, system controller 604 is intended to represent a broad category of computing devices known in the art. An example of such a computing device is a desktop computer system equipped with a high performance microprocessor(s), such as the Pentium® processor, Pentium® Pro processor, or Pentium® II processor manufactured by and commonly available from Intel Corporation of Santa Clara, Calif. Another example of such a computing device is an Internet "appliance" device, such as Microsoft's WebTV™ Internet Terminal available from Sony Electronics Inc. of Park Ridge, N.J., or Philips Consumer Electronics Company of Knoxville, Tenn. It is to be appreciated that the housing size and design for system controller 604 may be altered, allowing it to better visually fit into system 600.

It is also to be appreciated that the several entertainment system components depicted in FIG. 6 can be beneficially combined. By way of example, system controller 604 could be integrated into television/display device 602, DVD recorder/playback device 614, or audio/video tuner and amplifier 610.

Figure 7:
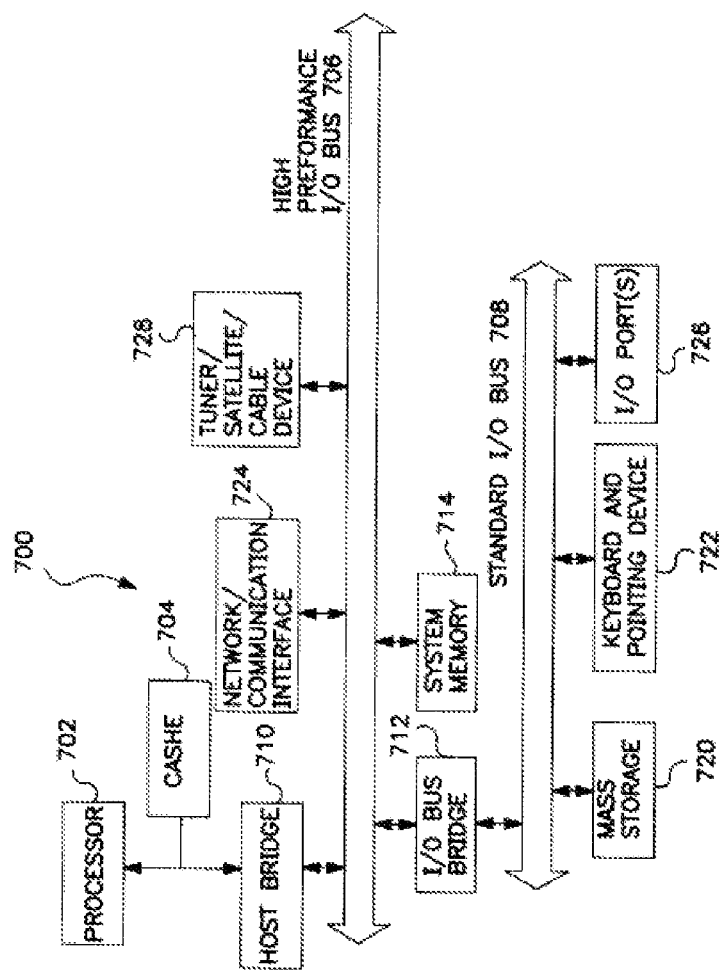
FIG. 7 illustrates one embodiment of a computing device suitable for use with the present invention.

FIG. 7 illustrates one embodiment of a computing device suitable for system controller 604 of FIG. 6. In the illustrated embodiment of FIG. 7, device 700 includes processor 702 and cache memory 704 coupled to each other as shown. Additionally, device 700 includes high performance input/output (I/O) bus 706 and standard I/O bus 708. Host bridge 710 couples processor 702 to high performance I/O bus 706, whereas I/O bus bridge 712 couples the two buses 706 and 708 to each other. Coupled to bus 706 are network/communication interface 724 and system memory 714. Coupled to bus 708 is mass storage 720, keyboard and pointing device 722, and I/O ports 726. Collectively, these elements are intended to represent a broad category of hardware systems, including but not limited to general purpose computer systems based on the Pentium® processor, Pentium® Pro processor, or Pentium® II processor, manufactured by Intel Corporation of Santa Clara, Calif.

In one embodiment, various electronic devices are also coupled to high performance I/O bus 706. As illustrated, analog tuner/digital satellite/cable devices 728, are also coupled to high performance I/O bus 706 to allow device 700 to "tune" to various programming input channels.

These elements 702-728 perform their conventional functions known in the art. In particular, network/communication interface 724 is used to provide communication between device 700 and any of a wide range of conventional networks, such as an Ethernet, token ring, the Internet, etc. It is to be appreciated that the circuitry of interface 724 is dependent on the type of network the device 700 is being coupled to.

Mass storage 720 is used to provide permanent storage for the data and programming instructions to implement the above described functions, whereas system memory 714 is used to provide temporary storage for the data and programming instructions when executed by processor 702. I/O ports 726 are one or more serial and/or parallel communication ports used to provide communication between additional peripheral devices which may be coupled to device 700.

It is to be appreciated that various components of device 700 may be re-arranged. For example, cache 704 may be on-chip with processor 702. Alternatively, cache 704 and processor 702 may be packaged together as a "processor module", with processor 702 being referred to as the "processor core". Furthermore, certain implementations of the present invention may not require nor include all of the above components. For example, mass storage 720, keyboard and pointing device 722, and/or network/communication interface 724 may not be included in device 700. Additionally, the peripheral devices shown coupled to standard I/O bus 708 may be coupled to high performance I/O bus 706; in addition, in some implementations only a single bus may exist with the components of device 700 being coupled to the single bus. Furthermore, additional components may be included in device 700, such as additional processors, storage devices, busses, or memories.

In one embodiment, system controller 604 of FIG. 6, as discussed above, is implemented as software routines run by device 700 of FIG. 7. These software routines comprise a plurality or series of instructions to be executed by a processor in a hardware system, such as processor 702 of FIG. 7. Initially, the series of instructions are stored on a storage device, such as mass storage 720. It is to be appreciated that the series of instructions can be stored using any conventional storage medium, such as a diskette, CD-ROM, magnetic tape, DVD, laser disk, ROM, Flash memory, etc. It is also to be appreciated that the series of instructions need not be stored locally, and could be received from a remote storage device, such as a server on a network, via network/communication interface 724. The instructions are copied from the storage device, such as mass storage 720, into memory 714 and then accessed and executed by processor 702. In one implementation, these software routines are written in the C++ programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with the above described functions of the present invention. By way of another example, system controller 604 could be implemented in one or more ASICs of an additional circuit board for insertion into hardware system 700 of FIG. 7.

Figure 8:
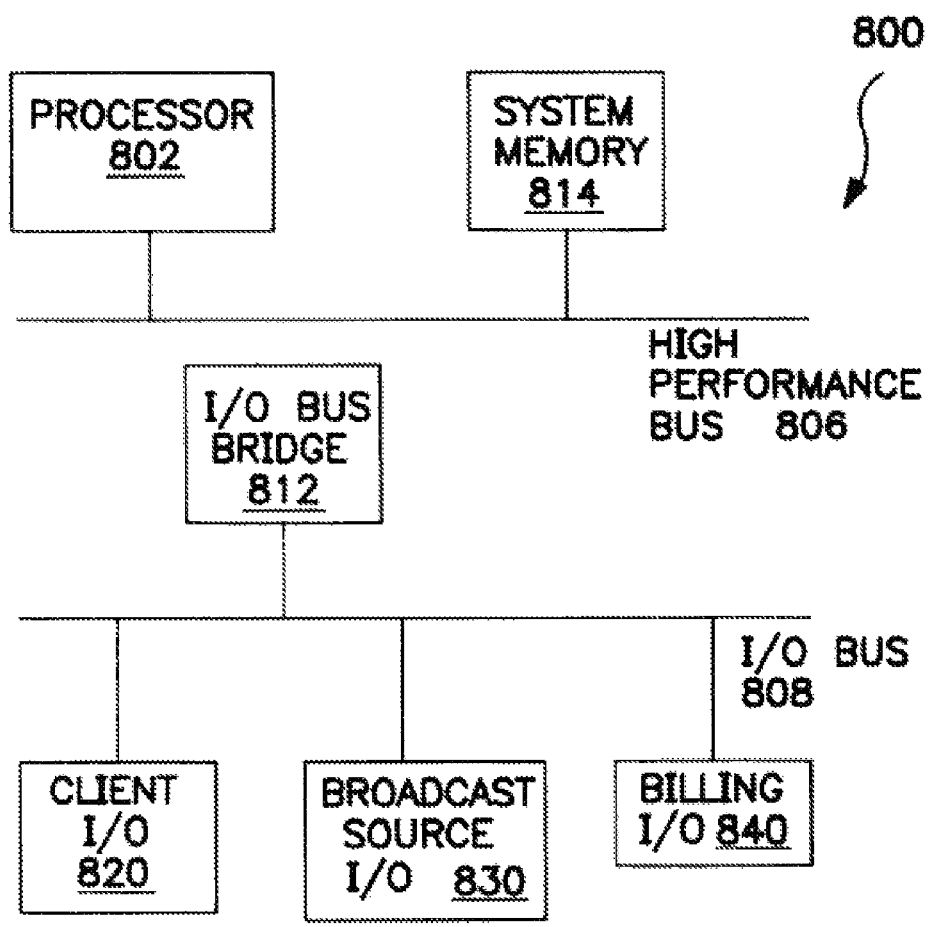
FIG. 8 illustrates one embodiment of a computing device suitable for use with the present invention.

FIG. 8 illustrates one embodiment of a computer system 800 suitable for server system 140. In the illustrated embodiment, computer system 800 includes processor 802 coupled to system memory 814 and I/O bus bridge 812 over high performance bus 806. I/O bus bridge 812, in turn, is coupled to client I/O module 820, broadcast source I/O module 830, and billing I/O module 840 over I/O bus 808. In alternate embodiments, one or more components of FIG. 8 may be re-arranged or combined. For instance, I/O modules 820, 830, and 840 may be combined into a single I/O module. In another embodiment, one or more additional components may be added such as additional buses, processors, memories, etc.

In the illustrated embodiment, system memory 814 provides storage for the data and programming instructions to be implemented by processor 802 to perform the above described functions of server system 140. Initially the programming instructions can be stored using any conventional storage medium, such as a diskette, a CD-ROM, magnetic tape, DVD, ROM, Flash memory, etc., and downloaded to system memory 814. It is to be appreciated that the series of programming instructions need not be stored locally, and could be received from a remote storage device such as a server on a network. From the instructions, processor 802 uses I/O modules 820, 830, and 840 to communicate with the respective entities to coordinate provision of and billing for the upgraded media features as discussed above.

In alternate embodiments, the functions of server system 110 can be implemented in discrete hardware or firmware. For example, one or more application specific integrated circuits (ASICs) could be programmed with the above described functions of server system 110. In another example, the functions could be implemented in one or more ASICs of an additional circuit board for insertion into computer system 800.

Thus, an improved method and apparatus for purchasing media features for broadcasts is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

We claim:

1. A method comprising:
   receiving information regarding a plurality of different entertainment programs and a plurality of different video resolutions associated with at least one entertainment program;
   displaying at a displaying device a list of entertainment programs and, for at least one entertainment program, a plurality of different video resolutions;
   receiving an entertainment program selection and a video resolution selection from a user via an input device;
   transmitting, via a communication network, the entertainment program selection together with the video resolution selection from the displayed plurality to an entertainment program provider, the video resolution selection being provided in part based on resolution capabilities of the displaying device, the displaying device intended for viewing the selected entertainment program; and receiving, via the communication network, the selected entertainment program in accordance with the selected video resolution and a token to enable the displaying device to display the selected entertainment program.

2. The method of claim 1 wherein receiving information comprises receiving information regarding costs for each of the plurality of different video resolutions and wherein displaying comprises displaying the costs.

3. The method of claim 1 further comprising:
receiving an entertainment selection and a video resolution selection from a user through the displaying device;
and wherein transmitting the selections comprises transmitting the selections received from the user.

4. The method of claim 3 wherein the user selection is received by interpreting signals transmitted from a user infrared transmitter.

5. The method of claim 1 wherein receiving information comprises receiving information regarding available programming transmission sources for the plurality of different video resolutions and wherein displaying comprises displaying an identification of the programming transmission sources.

6. The method of claim 5 wherein the programming transmission sources comprise at least one of local television stations, local radio stations, satellite broadcasters, coaxial cable broadcasters, and interactive sites on the internet.

7. The method of claim 6 wherein the programming transmission sources further comprise at least one of video tape, video disk and audio disk.

8. The method of claim 1 wherein receiving information comprises receiving information from a server system that is in communication with a plurality of programming transmission sources and wherein transmitting the selections comprises transmitting the selections to the server system.

9. The method of claim 8 wherein receiving the selected entertainment program comprises receiving the selected entertainment program in accordance with the selected video resolution from one of the plurality of programming transmission sources.

10. The method of claim 1 wherein receiving the selected entertainment program comprises receiving the selected entertainment program from one of cable television, antenna reception, satellite reception, mini-dish satellite reception, telephone dial-up service, and Internet access.

11. The method of claim 1 wherein receiving the selected entertainment program comprises receiving the token from an appropriate one of a plurality of programming transmission sources, the token enabling the reception of the selected entertainment program in accordance with the selected video resolution.

12. A non-transitory, machine readable medium having stored thereon data representing sequences of instructions which when executed by a processor, cause the processor to:
receive information regarding a plurality of different entertainment programs and a plurality of different video resolutions associated with at least one entertainment program;
display at a displaying device a list of entertainment programs and, for at least one entertainment program, the plurality of different video resolutions;
receive an entertainment program selection and a video resolution selection from a user via an input device;
transmit, via a communication network, an entertainment program selection together with a video resolution selection from the displayed plurality to an entertainment program provider, the video resolution selection being provided in part based on resolution capabilities of the displaying device, the displaying device intended for viewing the selected entertainment program; and
receive, via the communication network, the selected entertainment program in accordance with the selected video resolution.

13. The machine readable medium of claim 12 wherein the instructions further cause the processor to receive information regarding costs for the plurality of different video resolutions and display the costs.

14. The machine readable medium of claim 12 wherein the instructions further cause the processor to receive information regarding available programming transmission sources for the plurality of different video resolutions and display an identification of the programming transmission sources.

15. The machine readable medium of claim 14 wherein the programming transmission sources comprise at least one of local television stations, local radio stations, satellite broadcasters, coaxial cable broadcasters, and interactive sites on the internet.

16. The machine readable medium of claim 15 wherein the programming transmission sources further comprise at least one of video tape, video disk and audio disk.

17. The machine readable medium of claim 12 wherein the instructions further cause the processor to receive information from a server system that is in communication with a plurality of programming transmission sources and transmit the selections to the server system.

18. The machine readable medium of claim 17 wherein the instructions further cause the processor to receive the selected entertainment program in accordance with the selected video resolution from one of the plurality of programming transmission sources.

19. The machine readable medium of claim 12 wherein the instructions further cause the processor to receive the selected entertainment program from one of cable television, antenna reception, satellite reception, mini-dish satellite reception, telephone dial-up service, and Internet access.

20. The machine readable medium of claim 12 wherein the instructions further cause the processor to receive a token from an appropriate one of a plurality of programming transmission sources, the token enabling the reception of the selected entertainment program in accordance with the selected video resolution.

21. A non-transitory, machine readable medium having stored thereon data representing sequences of instructions which when executed by a processor, cause the processor to:
transmit, via a communication network, information regarding a plurality of different entertainment programs and a plurality of different video resolutions associated with each entertainment program to a plurality of client systems;
receive, via the communication network, an entertainment program selection together with a video resolution selection from at least one of the plurality of client systems, the video resolution selection being provided in part based on resolution capabilities of a displaying device intended for viewing the selected entertainment program; and
provide the at least one of the plurality of client systems with access to receive the selected entertainment program in accordance with the selected video resolution.

22. The machine readable medium of claim 21 wherein the instructions further cause the processor to instruct at least one of a plurality of programming transmission sources to transmit the selected entertainment program in accordance with the video resolution selection to the at least one of the plurality of client systems.

23. The machine readable medium of claim 21 wherein the instructions further cause the processor to provide a token from an appropriate one of a plurality of programming transmission sources to the at least one of the plurality of client systems, the token enabling the at least one of the plurality of client systems to receive the selected entertainment program in accordance with the selected video resolution.

24. The machine readable medium of claim 21 wherein the instructions further cause the processor to transmit information regarding costs for the plurality of different video resolutions.

25. The machine readable medium of claim 21 wherein the instructions further cause the processor to transmit information regarding available programming transmission sources for the plurality of different video resolutions.

26. The machine readable medium of claim 25 wherein the programming transmission sources comprise at least one of local television stations, local radio stations, satellite broadcasters, coaxial cable broadcasters, and interactive sites on the internet.

27. A method, comprising:
  transmitting, via a communication network, information regarding a plurality of different entertainment programs and a plurality of different video resolutions associated with each entertainment program to a plurality of client systems;
  receiving, via the communication network, an entertainment program selection together with a video resolution selection from at least one of the plurality of client systems, the video resolution selection being provided in part based on resolution capabilities of a displaying device intended for viewing the selected entertainment program; and
  providing the client system with access to receive the selected entertainment program in accordance with the selected video resolution.

28. The method of claim 27 further comprising instructing at least one of a plurality of programming transmission sources to transmit the selected entertainment program in accordance with the video resolution selection to the client system.

29. The method of claim 27 further comprising transmitting information regarding costs for the plurality of different video resolutions.

30. The method of claim 27 further comprising transmitting information regarding available programming transmission sources for the plurality of different video resolutions.

31. The method of claim 30 wherein the programming transmission sources comprise at least one of local television stations, local radio stations, satellite broadcasters, coaxial cable broadcasters, and interactive sites on the internet.

* * * * *